United States Patent [19]

Chang et al.

[11] Patent Number: 5,222,169
[45] Date of Patent: Jun. 22, 1993

[54] OPTICAL FIBER CONNECTOR ASSEMBLY

[75] Inventors: Peter C. Chang, Mountain View, Calif.; Hsin I. Lin, Taipei, Taiwan; Ui-Chin Chien, Chung-Ho, Taiwan; I-Li Chien, Taipei, Taiwan

[73] Assignee: Foxconn International, Inc., Sunnyvale, Calif.

[21] Appl. No.: 837,859

[22] Filed: Feb. 18, 1992

[51] Int. Cl.⁵ ............................................. G02B 6/36
[52] U.S. Cl. ............................................................ 385/87
[58] Field of Search .................. 385/78, 86, 87, 79-85

[56] References Cited

U.S. PATENT DOCUMENTS

| | | | |
|---|---|---|---|
| 4,634,214 | 1/1987 | Cannon, Jr. et al. | 385/86 |
| 4,747,659 | 5/1988 | Takahashi | 385/67 |
| 4,789,216 | 12/1988 | Schrott | 385/78 |
| 4,834,487 | 5/1989 | Abendschein et al. | 385/78 |
| 4,911,518 | 3/1990 | Miller | 385/78 |
| 5,033,808 | 7/1991 | Smith et al. | 385/68 |
| 5,052,774 | 10/1991 | Bulman et al. | 385/86 |
| 5,091,990 | 2/1992 | Leung et al. | 385/87 |
| 5,121,455 | 6/1992 | Palacek | 385/86 |
| 5,134,677 | 7/1992 | Leung et al. | 385/84 |
| 5,142,598 | 8/1992 | Tabone | 385/78 |
| 5,146,525 | 9/1992 | Tabone | 385/78 |

Primary Examiner—Frank Gonzalez

[57] ABSTRACT

An optical fiber cable connector assembly includes a first tubular housing (1) and a second tubular housing (2) connected to each other by complementary threads (12) and (211). An alignment ferrule (3) positioned within the inner hollow portions of the first housing (1) and the second housing (2) is provided for enclosing and fastening an optical fiber cable (9) therein, and is associated with a coil spring (4) to provide a resilient bumper effect. The rear portion of the alignment ferrule (3) is dimensioned to extend out of the rear end of the second housing (2) a predetermined distance. A coupling nut (5) is slidable axially around the first housing (1) and the second housing (2) for coupling to a corresponding connector. An extension ferrule (6) abutting against the rear end of the second housing (2), is surrounded by the cable jacket (94) and the strength members (93) separated from the optical fiber cable (9) wherein the strength members (93) further extend over the rear portion of the second housing (2), and a crimping ferrule (7) presses the strength members (93) and the jacket (94) onto the rear portion of the second housing (2) and onto the extension ferrule (6). A boot (8) surrounds the crimping ferrule (7) and covers a portion of the optical fiber cable close to the crimping ferrule (7).

16 Claims, 5 Drawing Sheets

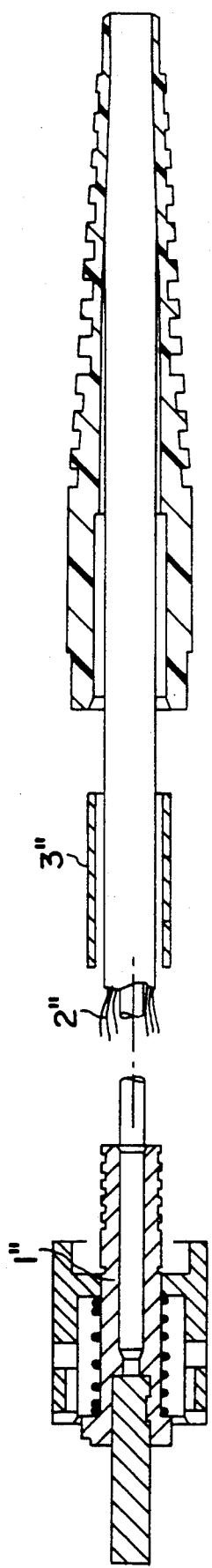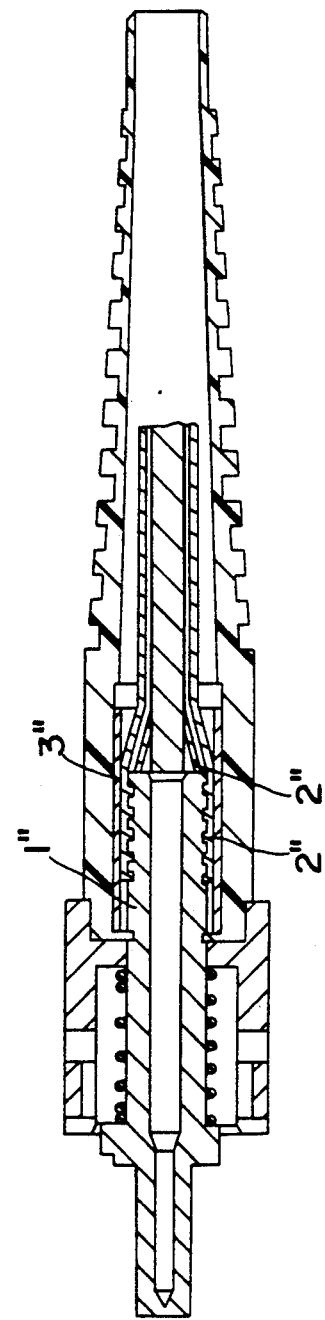

OPTICAL FIBER CONNECTOR ASSEMBLY

BACKGROUND OF THE INVENTION

1. Field of the Invention

The present invention relates to an optical fiber cable connector assembly, and particularly to a pre-assembled FC type optical fiber cable connector assembly which facilitates storage and shipping, and when received by the ultimate consumer, is ready for installation on an optical fiber cable.

2. Description of the Prior Art

In the conventional FC type optical fiber cable connector, the different components of the connector assembly are separately stored in inventory before they are combined for installation on an optical fiber cable. These different separate components are transferred to a workstation or to a customer where the optical fiber cable is ready for installation of these components on the optical cable by a technician through use of special tools to assemble these components to the optical fiber cable. From the viewpoint of handling and shipping, these separately inventoried components occupy more storage space and require more time during the manufacturing process, resulting in increased costs and inefficiency.

Referring to FIGS. 1, 2 and 3, or as disclosed in U.S. Pat. No. 4,747,659, the conventional FC optical fiber cable connector comprises a first tubular housing 1' and a second housing 2', retained assembled by the threaded interengagement of an internal threaded portion 11' of the first housing 1' and an external threaded portion 21' of the second housing 2'. A coupling nut 3' slidably moves along an outer surface of a rear portion of the first housing 1' within the limits imposed by external and radially outward projecting flanges 12' and 22' of the first housing 1' and the second housing 2', respectively, and an internal and radially inwardly projecting flange 31' of the coupling nut 3'. Associated with a coil spring 5', a plunger or alignment ferrule 4' is removably positioned within an inner space of the assembly of these two housings. A sleeve or boot 6' accompanying a crimping ferrule 7' is connected to a rear portion of the second housing 2'. With reference to FIGS. 2 and 3, when an optical fiber cable 8' is ready for assembly with the connector, a front end portion of the cable jacket 81' is removed to expose multiple strands of "Kevlar" or strength members 82'. These are sandwiched and fastened between the rear portion of the second housing 2' and the crimping ferrule 7'. A flexible buffer 83' within the strength member 82' centers a fiber 84' which extends forward into the second housing 2' and enters the alignment ferrule 4'.

For the sake of stabilization, the buffer 83' must be adhered to the inner surface of the alignment ferrule 4', and a quantity of adhesive, for example epoxy, may therefore be applied thereto. It is noted that if the components have been assembled as shown in FIG. 2 before combination with the optical fiber cable, it is not easy for a technician to inject the adhesive into the inner portion of the alignment ferrule 4' for fastening the buffer 83' without the likelihood of contamination of the inner portion of the second housing 2' due to the fact that the rear end portion 41' of the alignment ferrule 4' is deeply embedded within the second housing 2' and end 41' of the alignment ferrule 4' is far from the end opening 23' of the second housing 2'.

In other words, in that condition, the adhesive may invade the interior space between the second housing 2' and the alignment ferrule 4', even sticking to the coil spring 5' and jeopardizing its resilient bumper function. Accordingly, the components of the prior art fiber optical connector are held in inventory separately until the optical fiber is available to be combined therein. That is, the steps include passing the front end of the fiber cable 8' through the boot 6', the crimping ferrule 7', and the second housing 2' individually and sequentially, and directly faces into and moves close to the alignment ferrule 4', so the application of adhesive between the alignment ferrule 4' amd the fiber buffer 83' is under proper control without the risk of contamination to the second housing 2'. Consecutively, the second hosuing 2', which has surrounded the fiber cable, is moved toward the alignment ferrule 4' and connects with the first housing 1' by the corresponding threaded portions, accompanied by the coupling nut 3' surrounding the first housing 1' and the second housing 2' so that the internal radially inward extending flange 31' is positioned between the external radially outward extending flange 12' of the first housing 1' and the external radially outward extending flange 22' of the second housing 2'. Lastly, the crimping ferrule 7' presses the strength members 82' on the end portion of the second housing 2' and are covered by the boot 6'. As discussed above, obviously, this conventional FC type optical fiber connector has the disadvantage that it cannot be a semi-finished or a pre-assembled type product for the customer who is the manufacturer of an optical fiber cable and who intends to attach the connector to one end of the optical fiber cable for finalizing a completed product assembly. The disadvantage will result in excessive handling and inventory problems for the manufacturer.

By contrast, as shown in FIGS. 4 and 5, or in U.S. Pat. Nos. 4,634,214; 4,834,487; 4,911,518; and 5,033,808, an ST type optical fiber connector may be pre-assembled and ready for the further combination with the optical fiber cable under the condition that the epoxy adhesive can be controlled to not contaminate or spoil the outside portion of the alignment ferrule 1" because the alignment ferrule 1" extends outside to facilitate approach when the fiber cable is applied to this semifinished product. The obvious difference between an FC type connector and an ST connector is that the former is a two-housing enclosure and the latter is a one-housing enclosure. So, compared with an FC type connector, the obvious disadvantage of an ST type connector is that the strength members 2" are disposed onto the alignment ferrule 1" directly and sandwiched between the crimping ferrule 3" for combination of the cable and the connector, so that during mating with another corresponding connector, any occurring force acting on the ST connector will easily transfer detrimentally to the optical fiber due to its simple structure. It can be understood that in a poor environment, any slight vibration or movement of the optical fiber will result in undesired misinformation transfer or a communication interruption.

For the purpose of overcoming the respective flaws of these two different type connectors, it is an object of the present invention to provide an FC type connector which provides the respective advantages of these two type prior art connectors but without their respective disadvantages. Another object of the present invention is to provide an FC type connector that may be pre-assembled as a semi-finished product for convenience of stroage and shipping, like an ST connector, without the risk of contamination in further assembling with the optical fiber cable and which also keeps the better bumper effect during mating like an FC connector for maintaining true and reliable communication.

SUMMARY OF THE INVENTION

In terms of broad inclusion, the optical fiber connector assembly of the invention includes a first tubular housing and a second tubular housing connected to each other in coaxial alignment by complementary threaded portions. An alignment ferrule positioned within the inner hollow portions of the first and second housings encloses and fastens an optical fiber therein, and is associated with a coil spring to provide a resilient bumper effect. The rear portion of the alignment ferrule is dimensioned to extend out of the rear portion of the second housing a predetermined distance. A coupling nut is applied about the first housing and second housing for coupling a corresponding connector. An extension ferrule abuts against the rear end of the second housing, and is surrounded by the cable jacket and the Kevlar strength or cable reinforcement members split from the optical fiber cable so that the strength members extend to at least the rear portion of the second housing. A crimping ferrule binds the strength members and the cable jacket on the rear portion of the second housing and on the extension ferrule. A boot surrounds the crimping ferrule and a portion of the optical fiber cable close to the crimping ferrule.

The invention, together with further objects and attendant advantages, will be best understood with reference to the following detailed description taken in conjunction with the accompanying drawings. It is to be understood however that the invention is not limited to the embodiment described and illustrated since it may be embodied in various forms within the scope of the appended claims.

DESCRIPTION OF THE DRAWINGS

FIG. 4 is a cross-sectional exploded view of a conventional ST connector.

FIG. 5 is a cross-sectional view of a conventional ST connector in assembled form.

DESCRIPTION OF THE PREFERRED EMBODIMENT

Figure 6:
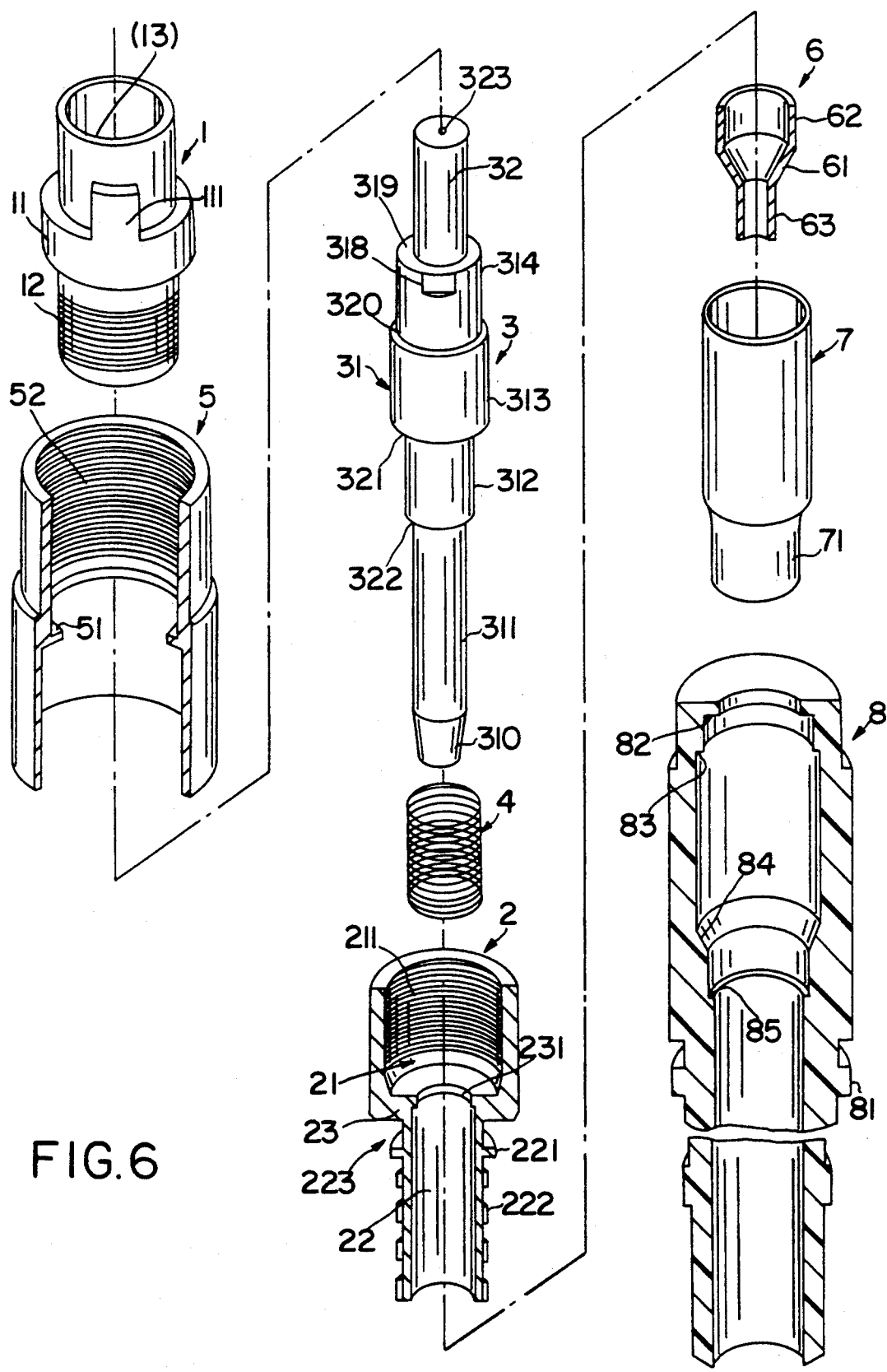
FIG. 6 is an exploded perspective view of a presently preferred embodiment of an FC connector according to this invention.
Figure 7:
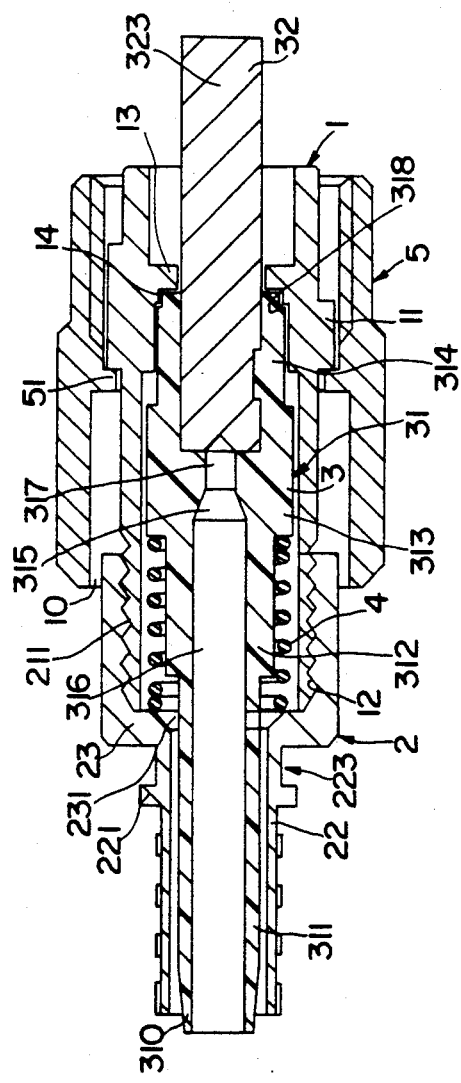
FIG. 7 is a cross-sectional view along the central axis of the partly pre-assembled connector of FIG. 6.

Referring to FIGS. 6 and 7, the subject optical fiber cable connector assembly includes a tubular first housing 1 having an external and radially outwardly projecting circumferential flange 11 about the middle portion of the tubular housing, and having a key portion 111 extending axially therefrom, and having external threads 12 on the rear portion of the housing. In an opposite direction to the outer flange 11, an integral and radially inwardly projecting flange 13 is provided on the inner periphery of the front portion of the housing 1. Referring to FIG. 7, adjacent the inner flange 13, projecting integrally from the inner surface of the housing, are a pair of diametrically opposed protrusions 14.

The second tubular housing 2 includes a large first section 21 having internal threads 211 on the inner periphery thereof for engaging the external threads 12 of the first housing 1. A reduced diameter integral second section 22 having an external stopper ring 221 spaced from the large first section 21, and having also a plurality of projecting circumferential rings 222 consecutively spaced at intervals along the outer surface of the second section 22 is also provided. A transverse step or shoulder 23 is formed between and integrally joins the first section 21 and the second section 22, and an internal and radially inwardly projecting flange 231 is formed thereon. A circumferential groove 223 is formed between the step 23 and the stopper ring 221.

Again referring to FIGS. 7 and 8, a tubular elongated alignment ferrule 3 of a multi-section shape is adapted to be positioned within and extend between the first housing 1 and the second housing 2. The alignment ferrule includes a main body 31 having a small outer diameter first section 311, a somewhat larger outer diameter second section 312, a large outer diameter third section 313, and a fourth slightly smaller end section 314, all axially aligned in sequential order. A conically tapered portion 310 is provided at the free end of the first section 311. A conically tapered inner peripheral portion 315 is formed within the central axially extending hollow bore portion of the third section 313, intermediate between and communicating a relatively large axial passageway 316 with a small axial passageway 317. Adjacent the end edge of the fourth section 314, a pair of flat regions or areas 318 are provided forming notches in diametrically opposite sides for engagement by the aforementioned protrusions 14 of the first housing adjacent the flange 13. A ceramic ferrule 32 dimensioned to pass through the inner periphery of the circumferential flange 13 of the first housing 1, and to be supported thereby, is connected to the front portion of the main body 31 by means of an insert molding process, by which one end of the tubular ceramic ferrule extends from the front end portion of the main body 31, and the opposite end portion is embedded within the inner bore portion of the third and fourth sections 313 and 314, adjacent the end of the small passageway 317. A central narrow exit passageway 323 extends axially longitudinally in the ceramic ferrule for conforming to the optical fiber, and is positioned in alignment with the axis of the passageway 317 of the main body 31. In the assembly of alignment ferrule 3, there are two transverse forward facing steps or shoulders 319-320, and two transverse rearward facing steps or shoulders 321-322 due to the different diameters of the coaxially aligned sections forming the alignment ferrule.

A coil spring 4 is adapted to surround the second alignment ferrule section 312 and is sandwiched between the inner periphery of the externally threaded portion of housing 1 and the outer periphery of ferrule 3. The tubular coupling nut 5 has on its middle portion an integral radially inwardly projecting circumferential flange 51 dimensioned to axially slidably and rotatably receive the outer periphery of the first housing 1. Internal threads 52 on the front portion of the coupling nut are provided for the purpose of detachably connecting the connector assembly to a complementary connector (not shown).

Referring to FIG. 7, the aforementioned components can be pre-assembled as a semi-finished product for the convenience of shipping and storage before it is combined with the optical fiber cable. The process of pre-assembling will be illustrated later.

Referring back to FIG. 6, the subject connector further includes a tubular metallic extension ferrule 6 having an integral funnel portion 61 intermediate its ends to communicate with a large section 62 at one end and a small section 63 at the opposite end wherein the axial hollow portion of the small section 63 is dimensioned to snugly surround the outer diameter of a portion of the optical fiber cable 9 devoid of the jacket 94 and the strength members 93. A tubular crimping ferrule 7, also of metal, is adapted to coaxially surround the extension ferrule 6 and has a reduced-diameter tail portion 71 surrounding the funnel portion 61 and small section 63 of the extension ferrule 6. An elongated, hollow, cylindrical, strain relief sleeve or boot 8 of a flexibly resilient material, such as plastic or rubber, has a plurality of external radially outwardly projecting circumferential rings 81 axially spaced on the rear portion of the boot. To conform to the contour of the crimping ferrule 7 and the rear portion of the second housing 2 (FIG. 8), the interior surface of the boot 8 is formed with a first rearward facing radially inwardly extending circumferential step 82 and a second rearward facing step 83 on the front portion of the boot 8, and a curved conical funnel portion 84, and a third forward facing step 85 on the middle portion of the boot 8.

Figure 1:
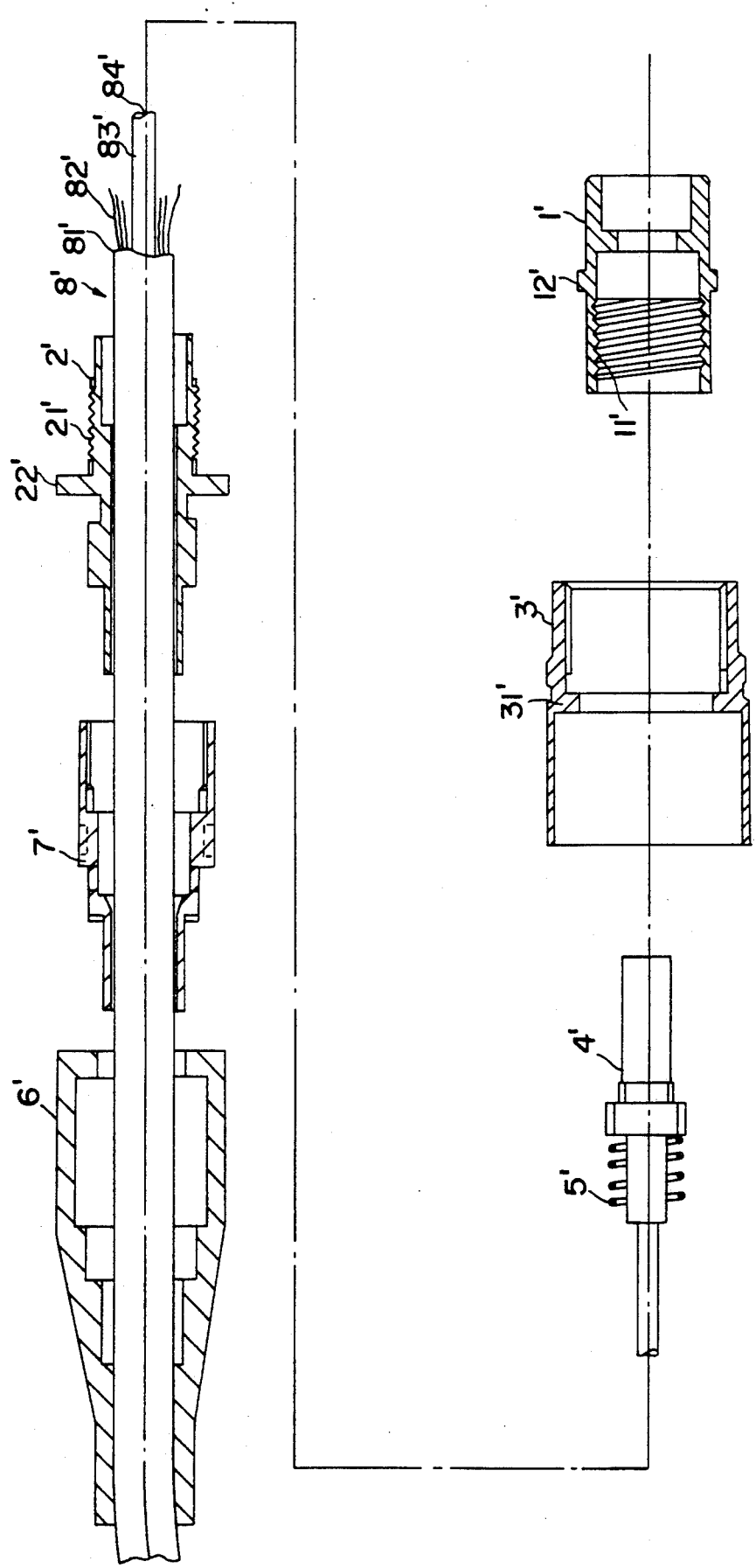
FIG. 1 is an exploded cross-sectional view of a conventional FC connector.
Figure 2:
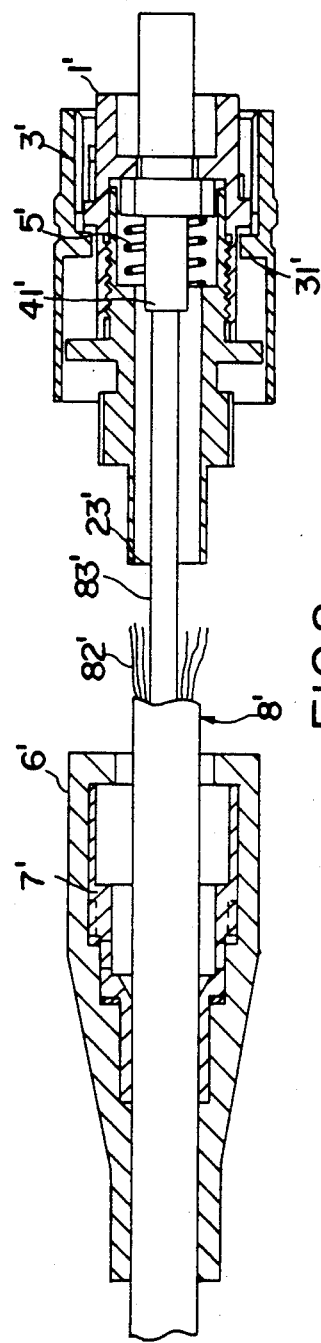
FIG. 2 is a cross-sectional view of a conventional FC connector illustrating the inconvenience of adhering a pre-assembled FC type connector to an optical fiber.
Figure 3:
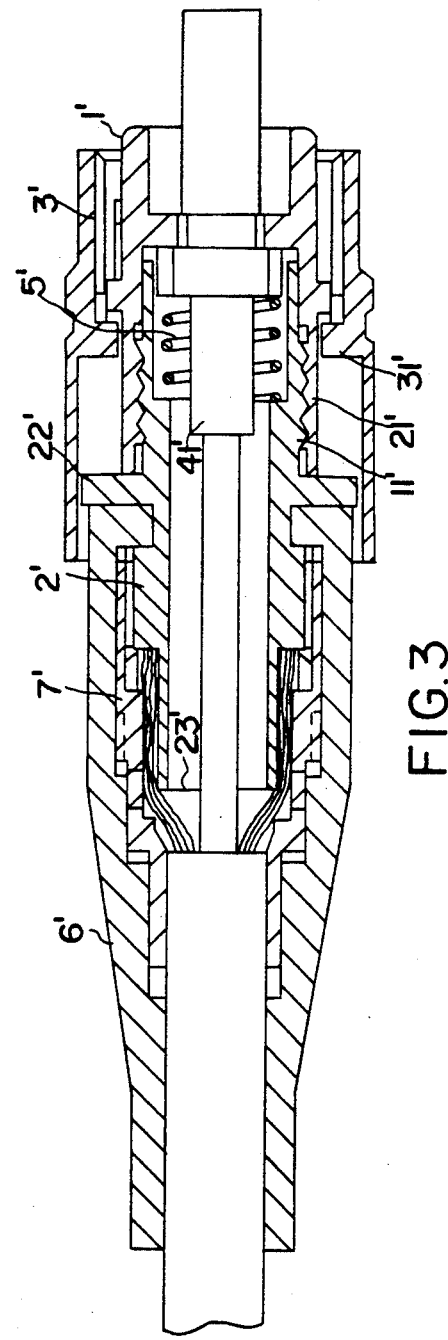
FIG. 3 is a cross-sectional view of a conventional FC connector in assembled form.
Figure 8:
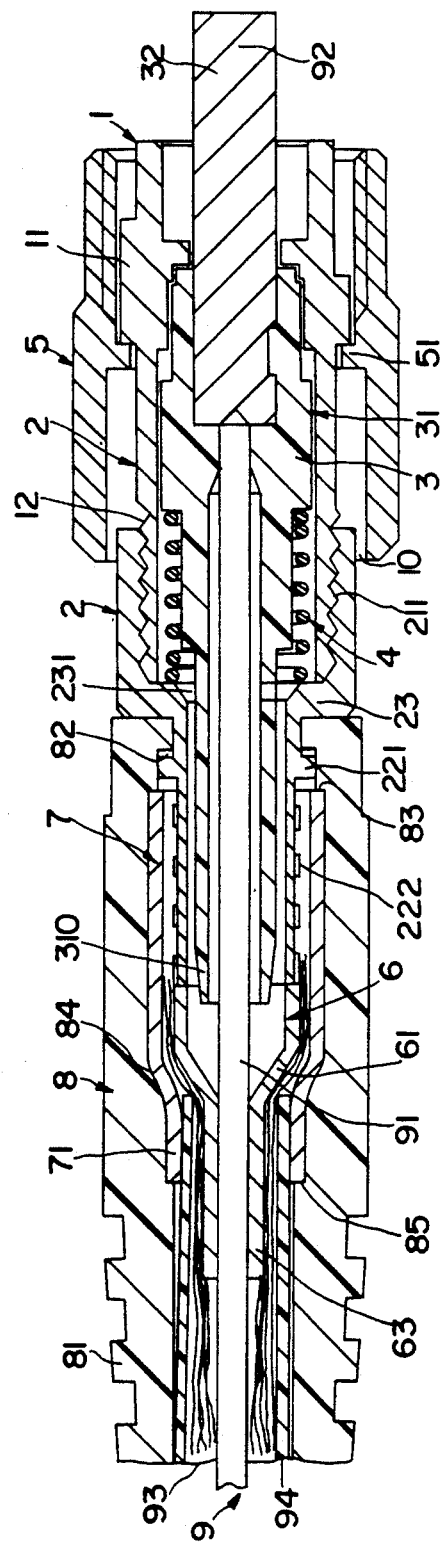
FIG. 8 is a cross-sectional view along the central axis of the assembly of FIG. 6 together with an optical fiber cable.

As illustrated in FIGS. 1 and 8, the optical fiber cable 9 applied to this invention is of known construction and includes a flexible buffer or sheath 91 concentrically encircling the embedded fiber 92, with the multiple strands of "Kevlar" or strength members 93 extending axially of the buffer or sheath 91, and distributed around the outer periphery of the buffer or sheath 91. An external and flexible outermost circumferential jacket 94 surrounds and encloses the "Kevlar" strength members.

Referring to FIG. 7, the subject FC connector of the invention can be pre-assembled as a semi-finished product as shown, to facilitate further assembly and shipping and storage. The process of pre-assembling is as follows:

(1) The alignment ferrule 3 (FIG. 6) associated with the coil spring 4 which encircles the second section 312 of the alignment ferrule 3, is inserted into the first housing 1 from the end 12, and the ceramic ferrule 32, previously molded into the end 12 of the alignment ferrule, passes through the inner flange 13 of the first housing 1 until the forward facing shoulder 319 of the alignment ferrule 3 abuts the inner flange 13 of the first housing 1. The flat regions 318 of the alignment ferrule 3 are engaged by the radial protrusions 14 of the first housing 1, so that there is no possibility of rotation of the alignment ferrule 3 within the first housing 1.

(2) The plastic coupling nut 5 encircles the first housing 1 from the end 12 until the inner flange 51 of the coupling nut 5 abuts the outer flange 11 of the first housing 1.

(3) The plastic second housing 2 is applied around the alignment ferrule 3 from the back, and then the first section 311 of the alignment ferrule 3 is little by little received within the second section 22 of the second housing 2. The first section 21 of the second housing 2 is fastened to the first housing 1 by means of its internal threads 211 engaging the outer threads 12 of the first housing 1. Under this situation, the coil spring 4, having previously been applied on the main body of ferrule 31, is compressed so one end abuts against the step 23 of the second housing 2, and the other end abuts against the step 321 of the alignment ferrule 3. Due to the resilient spring force, the step 319 of the alignment ferrule 3 abuts tightly against the inner flange 13 of the first housing 1. A clearance exists between the first or larger section 21 of the second housing 2 and the inner periphery of the rear larger portion of the coupling nut 5, so that the coupling nut 5 may move longitudinally along the first housing 1 and the second housing within the limits imposed by the outer flange 11 of the first housing 1 and the end of the first section 21 of the second housing 2, within which limits the inner flange 51 of the coupling nut 5 can be slidably adjusted. From the front end of this semi-finished product or pre-assembly, the ceramic ferrule 32 protrudes out of the first housing 1, and the conical frustum portion 310 of the alignment ferrule 3 protrudes out of the second housing 2 on the rear side as shown in FIG. 7.

This semi-finished product can be stored or handled as a unit that will ease the process of handling and save space in storage and the time of assembly. From a business viewpoint, a cable manufacturer would be more inclined to buy this unit rather than the conventional separate components that require further combination with the cable because its technician need not spend time in assembling these pre-assembled components. So, the installation time is reduced, and production efficiency increases.

This semi-finished product and the associated extension ferrule 6, crimping ferrule 7 and boot 8 are delivered to a customer, like an optical fiber cable manufacturer, in a common package. To illustrate the assembly of the connector and the fiber cable, referring to FIG. 8, the extension ferrule 6, the alignment ferrule 7 and the boot 8 are successively applied coaxially to the optical fiber cable 9 from the front end of the cable 9 and are moved rearward over an exposed proper length of the cable arranged for later connection. The extension ferrule 6 is moved forward and positioned at the back of the second housing 2 in coaxial alignment therewith, and the end edge of the large section 62 abuts against the rear end of the second housing 2. The front portion of the cable 9 is stripped to expose the inner buffer 91 which, associated with an appropriate adhesive surrounding its periphery, is successively inserted through the extension ferrule 6, the inner passageways 316, 315 and 317 of the alignment ferrule 3 from the back end thereof, until the front end of the buffer 91 abuts the ceramic ferrule 32. The adhesive coats and adheres the buffer 91 to the inner surface of the passageway 317 of the alignment ferrule 3. The stripped optical fiber 92 that extends beyond the exposed buffer 91 is fitted into the passageway 323 of the ceramic ferrule 32, of which the front end can be flush with, or protrude over if desired, the front transverse mating surface of the ceramic ferrule 3.

Removed from the buffer 91 and the optical fiber 92, the separated strength members 93 accompanying the external jacket 94 encircle the extension ferrule 6 where the jacket 94 terminates at the intersection of the funnel portion 61 and the small section 63, but the strength members 93 extend forward and pass over or around the funnel portion 61, the large section 62 of the extension ferrule 6, and the second section 22 of the second housing 2 until close to the stopper ring 221 of the second housing 2. Then, the crimping ferrule 7, which has previously been installed around the outer jacket 94 of the cable, is moved axially along the cable to the forward position until its front end is close to yet spaced from the stopper ring 221 of second housing 2.

Through a crimping process, the exposed strength members 93 are clamped between the crimping ferrule 7 and the second section 22 of the second housing 2, the large section 62 and the funnel portion 61 of the extension ferrule 6. Similarly, the front portion of the outer jacket 94 and the associated inner strength members 93 are clamped between the crimping ferrule 7 and the small section 63 of the extension ferrule 6. The plural projecting rings 222 provide increased friction to retain the crimping ferrule 7 and the sandwiched strength members 93 in place. Lastly, the flexible rubber or plastic boot 8 is moved forwardly to cover the crimping ferrule 7 until the radial flange 82 is properly seated within the groove 223 of the second housing 2, and also the front and the rear circumferential edges of the crimping ferrule 7 abut against the second step 83 and third step 85, respectively, so that the boot 8, the crimping ferrule 7 and the second housing 2 will be fixedly interengaged.

As aforementioned, although the coupling nut 5 is moveable axially and rotatably along the first housing 1 and the second housing 2 within a limited distance, it will be understood that when mating with a complementary connector, the coupling nut 5 is moved to a forward position, i.e. the inner flange 51 abuts against the outer flange 11 of the first housing 1, so that the exposed internal threads 52 of the coupling nut 5 can be easily threadably engaged with corresponding external threads of the complementary connector (not shown). The key portion 111 of the first housing 1 provides an orientation function for this connection. Also, in response to axial abutment of the ceramic ferrule 32 with the alignment ferrule of the complementary connector, the alignment ferrule 3 is moveable within the first housing 1 and the second housing 2 to compress the spring 4 and produce a spring bias to urge the front ceramic ferrule into face-to-face abutment with the radial flange 13 of the first housing 1. The first section 311, including the truncated cone portion 310 of the main body 31 of the alignment ferrule 3, is moveable in and along a space which is formed by the large section 62 and the funnel portion 61 of the extension ferrule 6 during retraction of the alignment ferrule 3 into the first housing 1 and the second housing 2 to compress the spring 4 until the step 322 of the alignment ferrule 3 is obstructed by the step 23 of the second housing 2.

It is noted that the alignment ferrule 3 must fulfill important requirements, described as follows. The rear end of the alignment ferrule 3, i.e. the end of first section 311 must protrude out of the rear end of the second housing 2, so that to this semi-finished product, the application of adhesive can be easily controlled to prevent invasion of the adhesive into the space between the second housing 2 and the alignment ferrule 3 when a buffer 91 encircling a fiber 92 associated with adhesive surrounding its periphery is inserted successively into the passageways 316, 315 and 317 of the alignment ferrule 3 for installation.

It should also be understood that the unique extension ferrule 6 functions to provide a proper space to receive the first section 311 of the rearward-moveable alignment ferrule 3.

It is noted that the unique extension ferrule 6 cooperates with the crimping ferrule 7 to sandwich the jacket 94 and the associated strength members 93. The retention force exerted on the jacket 94 by the crimping ferrule 7 enhances the combination of the connector and the optical fiber cable for the entire final assembly. In contrast, the conventional FC connector has no extension ferrule 6, whereby the jacket 94 is not directly fastened to any relevant parts of the connector, so that the prior art connector is unable to withstand the applied forces relative to the cable, thus being inherently weaker in comparison to the present invention.

It is also seen that the inner diameter of the small section 63 of the extension ferrule 6 is dimensioned to fit snugly around the flexible buffer 91 passing therethrough. The strength members 93 and the jacket 94 are clearly separated from the buffer 91 and the optical fiber 92 by the extension ferrule 6.

It can also be seen that compared to the conventional FC connector as shown in FIG. 1, in the present invention the internal flange 231 of the second housing 2 snugly surrounds the first section 311 of the alignment ferrule 3, so it is practically impossible to have any adhesive invade the space containing spring 4. The prior art FC connector is susceptible to this problem.

The present invention uses inner threads 211 of the second housing 2 and outer threads 12 of the first housing 1 to combine these two housings together, and when mating the present connector with a complementary connector, the combined thread portions are positioned adjacent but spaced from the tail portion of the coupling nut 5, and thus far from the portion thereof which is close to the front mating portion of the connector. So, any vibration or movement due to mating the complementary connectors will not affect the combination of these two housings. It is also noted that when the coupling nut 5 is in the forward position for coupling another connector, the tail portion of the coupling nut 5 still encircles the front end of the second housing 2 such that the small clearance 10 between these two parts, as shown in FIGS. 7 and 8, will prevent the housing assemblies from improper vibration or swing relative to the coupling nut 5 and firmly retain the whole assembly.

As aforementioned, the present invention provides a semi-finished optical fiber connector for assembly with an optical fiber cable at a later time. It taskes less assembly time for a customer who assembles this semi-finished connector to an optical fiber cable than to assemble a group of conventional separate components to the same or a similar optical fiber cable, so the invention is advantageous from the viewpoint of time-saving. Also, inventory and shipping can be simplified due to most components of the connector having been pre-assembled.

While the invention has been described in connection with what is presently considered to be the most practical and preferred embodiment, it is to be understood that the invention is not limited to the disclosed embodiment but, on the contrary, is intended to cover various modifications and equivalent arrangements included within the spirit and scope of the appended claims.

Having thus described the invention, what is believed to be new and novel, and sought to be protected by letters patent of the United States is as follows:

What is claimed is:

1. A connector assembly for an optical fiber cable including a flexible buffer member surrounding the optical fiber, a layer of filamentary strength members surrounding the buffer, and a cable jacket surrounding the strength member, comprising:
   a) a tubular first housing and a tubular second housing coaxially adjustably connected to each other to form a housing assembly;
   b) a tubular alignment ferrule coaxially movably mounted within the housing assembly and having an inner coaxial passageway to receive therethrough said optical fiber and its associated surrounding flexible buffer;
   c) a spring positioned between the housing assembly and the tubular alignment ferrule to provide a spring bias against the alignment ferrule when said first and second tubular housings are interconnected;
   d) a tubular coupling nut slidably and rotatably coaxially encircling a front portion of the housing assembly;
   e) a tubular crimping ferrule coaxially surrounding a rear portion of said housing assembly whereby a portion of the strength members of the optical fiber cable is positioned within the crimping ferrule and sandwiched between said crimping ferrule and said rear portion of the housing assembly;
   f) a tubular boot concentrically surrounding the rear portion of the housing assembly and said crimping ferrule;
   g) said alignment ferrule having an elongated rear portion one end of which protrudes out of said rear portion of the housing assembly a distance to facilitate adhesion of the optical fiber and the associated buffer within said inner coaxial passageway of the alignment ferrule; and
   h) a tubular extension ferrule having an enlarged end abutting the rear portion of the housing assembly and surrounding the rear end of the alignment ferrule to provide a space for accommodating rearward movement of the alignment ferrule.

2. The connector assembly as described in claim 1, wherein a portion of said cable jacket and a portion of the strength members of the first optical cable are separated from the buffer and sandwiched between the crimping ferrule and the tubular extension ferrule.

3. The connector assembly as described in claim 2, wherein the coupling nut has internal threads on a front portion to threadably engage a complementary connector.

4. The connector assembly as described in claim 3, wherein said first housing comprises:
   a) an external and radially outwardly projecting flange on a middle portion thereof;
   b) an internal radially inwardly projecting flange on an inner surface of a front portion thereof;
   c) a pair of diametrically opposed orientation protrusions extending axially from said radially inwardly projecting flange;
   d) threads formed externally on a rear portion thereof; and
   e) wherein the second housing comprises:
   a first section having internal threads thereon for engaging the external threads of the first housing to adjustably connect the first housing to the second housing;
   a second section having a radially outwardly projecting stopper ring and a plurality of projecting rings consecutively axially spaced along an outer surface thereof;
   a step formed between said first and second sections, and from which an internal flange extends inward; and
   a circumferential groove formed between the stopper ring and said step;
   said coupling nut having a radially inward projecting flange on a middle portion dimensioned to snugly receive the first housing and adapted to slidably move axially between the first section of the second housing and the external radially outwardly projecting flange of the first housing.

5. The connector assembly as described in claim 4, wherein the alignment ferrule comprises a main body including in coaxially arranged successive order and in a back-to-front direction a small external diameter first section, a relatively larger external diameter second section, a third section larger in external diameter than said second section, and a fourth section smaller in external diameter than said third section; a pair of flat regions formed adjacent one edge of the fourth section in diametrically opposite directions for engaging the orientation protrusions of said first housing;
   a ceramic ferrule dimensioned to pass through the inner flange of the first housing and connected to a front portion of the main body of the alignment ferrule, one end of said ceramic ferrule extending out of the ferrule main body and through the first housing and the other end being embedded in the third section.

6. The connector assembly as described in claim 5, wherein said spring comprises a coil compression spring that encircles the second section of the alignment ferrule, one end of said spring abutting the step of the second housing and the other end of said spring abutting the third section of the alignment ferrule whereby a spring bias is imposed on said alignment ferrule so that the fourth section of the alignment ferrule normally resiliently abuts the inner flange of the first housing.

7. The connector assembly as described in claim 6, wherein said boot has an inner periphery and a first step on a front portion thereof, and a pair of mutually facing steps formed in the inner periphery, one of said mutually facing steps being adjacent said first step such that the front portion of the boot is seated within the groove of the second housing and the first step of the boot is abutted against the stopper ring of the second housing, and the crimping ferrule is positioned between said pair of mutually facing steps of the boot.

8. The connector assembly as described in claim 5, wherein the internal flange of the second housing snugly surrounds the first section of the alignment ferrule.

9. The connector assembly as described in claim 8, wherein the extension ferrule has a large internal diameter section, a small internal diameter section, and an intermediate funnel portion, said small internal diameter section adapted to conformably surround the buffer member of said optical fiber cable stripped of the outer jacket and the strength members.

10. A semi-finished connector assembly for an optical fiber cable including a flexible buffer member surrounding the optical fiber, a layer of filamentary strength members surrounding the buffer, and a cable jacket surrounding the strength members, comprising:
   a tubular front first housing and tubular rear second housing coaxially adjustably connected to each other by complementary threads thereon to form a connector housing assembly whereby the first housing is adapted to engage with a complementary connector;

a tubular alignment ferrule coaxially movably mounted within the housing assembly and having an inner coaxial passageway for receiving therethrough said optical fiber and its associated surrounding flexible buffer;

a spring positioned between the housing assembly and the tubular alignment ferrule to provide a spring bias against the alignment ferrule when said first and second tubular housings are interconnected; and a tubular coupling nut slidably and rotatably coaxially encircling a front portion of the housing assembly;

said alignment ferrule having an elongated rear portion one end of which protrudes rearward out of a rear portion of the second housing for preventing invasion of adhesive into a space between the second housing and the alignment ferrule when the buffer encircling the fiber associated with adhesive surrounding its periphery is inserted into said passageway of the alignment ferrule for installation.

11. The semi-finished connector as described in claim 10, wherein the coupling nut has internal threads on a front portion to engage a complementary connector.

12. The semi-finished connector as described in claim 11, wherein the first tubular housing has an external radially outwardly projecting flange on a middle portion thereof, and an internal radially inwardly projecting flange on an inner surface of a front portion thereof, a pair of diametrically opposed orientation protrusions extending axially from said inwardly projecting flange, the threads positioned externally on a rear portion extending to an end of said first tubular housing; said second housing having a first section having internal threads thereon for threadably engaging the external threads of the first housing, a second section of relatively less diameter coaxially integral with said first section and having a stopper ring and a plurality of projecting rings axially spaced along an outer surface thereof, a step formed between the first section and the second section of said second housing and from which a internal flange extends radially inward, and a circumferential groove formed between the stopper ring and the step, said coupling nut having on a middle portion thereof an inner radially inwardly projecting flange dimensioned to conformably receive the first housing and slidably move axially between the first section of the second housing and the external radially outwardly projecting flange of the first housing.

13. The semi-finished connector as described in claim 12, wherein the tubular alignment ferrule possesses a multi-section shape symmetrical about a longitudinal axis and includes a main body composed of a relatively small diameter first section, a relatively larger diameter second section, a maximum diameter third section, and a relatively smaller diameter fourth section, all said sections arranged in axial order, a pair of flat regions positioned adjacent one edge of the fourth section in diametrically opposite relation for engaging said orientation protrusions of the first housing, a ceramic ferrule dimensioned to pass through the inner flange of the first housing and connected to a front portion of the main body, one end of the ceramic ferrule extending out of the main body and through the first housing and the other end of the ceramic ferrule being embedded in the third section.

14. The semi-finished connector as described in claim 13, wherein said spring is a coil compression spring and encircles the second section of the tubular alignment ferrule, one end of the spring abutting the step of the second housing, and the other end abutting the third section of the tubular alignment ferrule, to resiliently bias the fourth section of the tubular alignment ferrule against the inner flange of the first housing.

15. The semi-finished connector as described in claim 13, wherein the internal flange of the second housing snugly surrounds the first section of the alignment ferrule.

16. A manufacturing method for enabling a manufacturer to produce a pre-assembly as a semi-finished product for storage and to ship said semi-finished product to a customer for subsequent assembly with a fiber optical cable comprising the following steps:

assembling an alignment ferrule and a coil compression spring so that the spring encircles a rear portion of the alignment ferrule;

inserting the alignment ferrule and the associated spring coaxially into a first tubular housing from the rear end thereof;

disposing a coupling nut around the first housing by moving the coupling nut axially onto and along the first housing;

connecting a second housing to the first housing by threadably engaging threads of the first housing with complementary threads of the second housing whereby the spring is compressed to provide a resilient spring bias against the alignment ferrule, adjusting the relationship of said first and second housings whereby the coupling nut slidably moves axially within a limit distance defined by said first and second housings, and the rear end of the alignment ferrule protrudes beyond the second housing; wherein said semi-finished product can further be assembled to an optical fiber cable to form a final product by the following steps:

removing a peripheral jacket and multiple strands of strength members from a front portion of the optical fiber cable while retaining a buffer and a central optical fiber;

inserting the optical fiber associated with the buffer into the alignment ferrule from the back, and adhesively securing the buffer to the alignment ferrule;

disposing an extension ferrule axially adjacent the rear portion of the alignment ferrule;

disposing a crimping ferrule onto the extension ferrule and a rear portion of the second housing wherein the separate jacket and strength members are clamped between the crimping ferrule and the extension ferrule, said strength members further extending forward to be sandwiched between the crimping ferrule and the rear portion of the second housing; and disposing a boot onto the crimping ferrule, which further covers a portion of the optical fiber cable.

* * * * *